United States Patent
Otero Martinez et al.

(10) Patent No.: US 10,640,602 B2
(45) Date of Patent: May 5, 2020

(54) FLAME-RETARDANT POLYURETHANE FOAMS

(71) Applicant: BASF SE, Ludwigshafen (DE)

(72) Inventors: Iran Otero Martinez, Lemfoerde (DE); Jose Manuel Lopez Lopez, Barcelona (ES); Ferran Antich Moros, Barcelona (ES)

(73) Assignee: BASF SE, Ludwigshafen (DE)

(*) Notice: Subject to any disclaimer, the term of this patent is extended or adjusted under 35 U.S.C. 154(b) by 266 days.

(21) Appl. No.: 13/731,275

(22) Filed: Dec. 31, 2012

(65) Prior Publication Data

US 2013/0172435 A1    Jul. 4, 2013

Related U.S. Application Data

(60) Provisional application No. 61/582,506, filed on Jan. 3, 2012.

(51) Int. Cl.
| | | |
|---|---|---|
| *C08G 18/48* | (2006.01) | |
| *C08G 18/32* | (2006.01) | |
| *C08G 18/66* | (2006.01) | |
| *C08G 101/00* | (2006.01) | |

(52) U.S. Cl.
CPC ..... *C08G 18/4829* (2013.01); *C08G 18/3206* (2013.01); *C08G 18/485* (2013.01); *C08G 18/4812* (2013.01); *C08G 18/4816* (2013.01); *C08G 18/4825* (2013.01); *C08G 18/4833* (2013.01); *C08G 18/6677* (2013.01); *C08G 2101/00* (2013.01); *C08G 2101/0083* (2013.01)

(58) Field of Classification Search
CPC ............... C08G 18/48; C08G 18/3206; C08G 18/4812; C08G 18/4816; C08G 18/4825; C08G 18/4829; C08G 18/4833; C08G 18/485; C08G 18/6677; C08G 2101/00; C08G 2101/005; C08G 2101/0083; C08K 5/49; C08K 5/53; C08J 9/0038; C08J 9/08; C08J 2203/02; C08J 2203/10
See application file for complete search history.

(56) References Cited

U.S. PATENT DOCUMENTS

| | | | |
|---|---|---|---|
| 4,382,042 A | | 5/1983 | Hardy et al. |
| 5,616,628 A | * | 4/1997 | von Bonin et al. ......... 521/157 |
| 5,739,173 A | * | 4/1998 | Lutter et al. ................. 521/99 |
| 2004/0116545 A1 | * | 6/2004 | Jakobstroer et al. ........ 516/115 |
| 2007/0112084 A1 | * | 5/2007 | Hansel et al. ............... 521/107 |
| 2011/0184079 A1 | * | 7/2011 | Milliren et al. .............. 521/56 |

FOREIGN PATENT DOCUMENTS

| | | |
|---|---|---|
| DE | 197 02 760 A1 | 7/1998 |
| EP | 0 629 607 A2 | 12/1994 |
| JP | H05105811 | 4/1993 |
| JP | H08259577 | 10/1996 |
| JP | 2004043747 * | 6/2005 |
| WO | WO 00/46283 | 8/2000 |
| WO | WO 01/25324 A1 | 4/2001 |
| WO | WO 02/079315 A1 | 10/2002 |
| WO | WO 2009/103764 A1 | 8/2009 |

OTHER PUBLICATIONS

"Syntactic and Composite Foams III", program by Engineering Conferences International, held in Italy from May 29 to Jun. 3, 2011, 10 pages.

Office Action dated Jun. 28,2018, in Japanese Patent Application No. 2014-550664 filed Dec. 12, 2012.

* cited by examiner

*Primary Examiner* — John M Cooney
(74) *Attorney, Agent, or Firm* — Oblon, McClelland, Maier & Neustadt, L.L.P.

(57) ABSTRACT

Process for producing a flame-retardant polyurethane foam of density from 5 to 50 g/L, by mixing (a) organic polyisocyanate with (b) polymeric compounds having at least two hydrogen atoms reactive toward isocyanates, (c) optionally chain extender and/or crosslinking agent, (d) flame retardant, (e) blowing agent, (f) catalysts, and optionally (g) auxiliary and additives to give a reaction mixture and permitting said reaction mixture to react completely, where the flame retardant (d) comprises expandable graphite and oligomeric organophosphorus flame retardant. The present invention further relates to a flame-retardant polyurethane foam which can be produced by a process of the invention, and also to the use of this foam in vehicles for acoustic insulation.

20 Claims, No Drawings

FLAME-RETARDANT POLYURETHANE FOAMS

Process for producing a flame-retardant polyurethane foam of density from 5 to 50 g/L, by mixing (a) organic polyisocyanate with (b) polymeric compounds having at least two hydrogen atoms reactive toward isocyanates, (c) optionally chain extender and/or crosslinking agent, (d) flame retardant, (e) blowing agent, (f) catalysts, and optionally (g) auxiliary and additives to give a reaction mixture and permitting said reaction mixture to react completely, where the flame retardant (d) comprises expandable graphite and oligomeric organophosphorus flame retardant. The present invention further relates to a flame-retardant polyurethane foam which can be produced by a process of the invention, and also to the use of this foam in vehicles for acoustic insulation.

Polyurethane foams are suitable for a large number of applications, for example cushioning materials, thermal insulation materials, packaging, automobile-dashboards, or construction materials. Many of these applications require effective flame retardancy. A very wide variety of flame retardants have therefore previously been described for polyurethanes. The use of effective flame retardants is very important particularly for low-density polyurethane foams, since the large surface area of these makes them particularly susceptible to fire.

Halogenated compounds are therefore used by way of example as flame retardants. Halogenated flame retardants, however, in particular brominated flame retardants, are undesirable for toxicological, environmental, and regulatory reasons. However, halogenated flame retardants also cause increased smoke density in the event of a fire. Furthermore, thermal operations, such as the thermoforming of plastically deformable polyurethane foams, can give rise to undesirable release of hydrogen halides.

Phosphorus-containing compounds, among which are organophosphorus compounds, are widely used flame retardants. Organophosphorus flame retardants are mostly based on phosphate esters, phosphonate esters, or phosphite esters. Known phosphorus-containing flame retardants, such as triethyl phosphate (TEP) or diethyl ethanephosphonate (DEEP), contribute by way of example to emissions from the plastics, thus giving these an unpleasant odor. This hinders the use of said flame retardants in the production of polyurethane foams intended for use in enclosed spaces, for example in the passenger compartment of an automobile. Many of the known phosphorus-containing compounds moreover have an adverse effect on the foaming reaction during the production of polyurethane foams, and also have an adverse effect on the properties of the foams, for example mechanical properties. By way of example, the use of said flame retardants, especially during the production of low-density polyurethane foams of density 50 g/L or lower, leads to foam collapse and to shrinkage. This in particular affects the more flexible types of foam and open-cell foams. Known liquid flame retardants also often act as plasticizers.

Mixtures of different flame retardants are often used in order to improve flame-retardant properties, and also in order to mitigate the disadvantages of the individual flame retardants. Expandable graphite has proven to be a particularly effective component of said flame retardant mixtures. By way of example, DE 19702760 describes the combination of expandable graphite with various halogen-containing and halogen-free phosphates, preferably trialkyl phosphates, in the production of polyurethane foams.

WO 0046283 describes various combinations of expandable graphite and phosphorus compounds, e.g. Exolit (ammonium polyphosphate), tris(2-chlorisopropyl) phosphate (TCPP), and generally phosphonate esters and phosphate esters. WO01025324, too, describes the combination of expandable graphite with phosphate, phosphonate, or phosphine oxide, in particular those having aromatic substituents, for producing flame-retardant polyurethane foams.

Despite improvements due to the combination of expandable graphite with phosphorus-based flame retardants, with resultant reduction in the amounts that have to be used of the individual components, polyurethane foams comprising combinations of said flame retardants continue to exhibit known disadvantages, such as odor. Said flame retardant combinations also exhibit adverse effects on the foaming reaction, in particular in the case of low-density foams of density 50 g/L and lower, and also on the mechanical properties of the foams. Finally, there is also scope for further improvement in flame retardant action for a given amount of flame retardant used.

WO 2002079315 describes flame retardant additives composed of a mixture of an organophosphorus flame retardant, a benzofuran-2-one stabilizer, and a monomeric phosphate ester compatibilizer intended to mitigate the core discoloration of a polyurethane foam, the effect known as "scorch". An oligomeric polyphosphate flame retardant can be used as organophosphorus flame retardant here.

It was an object of the present invention to use flame retardants to provide low-density flame-retardant polyurethane foams which exhibit low emission levels together with low odor, good mechanical properties, and excellent fire performance. Another object was to provide a process for producing said polyurethane foams, while avoiding shrinkage of the foams during production of same.

The object of the invention was achieved via flame-retardant polyurethane foams of density from 5 to 50 g/L which can be produced by mixing (a) organic polyisocyanate with (b) polymeric compounds having at least two hydrogen atoms reactive toward isocyanates, (c) optionally chain extender and/or crosslinking agent, (d) flame retardant, (e) blowing agent, (f) catalysts, and optionally (g) auxiliary and additives to give a reaction mixture and permitting said reaction mixture to react completely, where the flame retardant (d) comprises expandable graphite and oligomeric organophosphorus flame retardant, and also the corresponding production process.

For the purposes of the invention, polyurethane foams are understood to be foams in accordance with DIN 7726. The density of these flame-retardant polyurethane foams of the invention is from 5 to 50 g/L, particularly preferably from 5 to 30 g/L, and in particular from 5 to 20 g/L. The flame-retardant polyurethane foams of the invention comprise flexible polyurethane foams, semirigid polyurethane foams, and rigid polyurethane foams. The compressive stress value for flexible polyurethane foams of the invention at 10% compressive strain or compressive strength in accordance with DIN 53 421/DIN EN ISO 604 is 15 kPa or less, preferably from 1 to 14 kPa, and in particular from 4 to 14 kPa. The compressive stress value for semirigid polyurethane foams of the invention at 10% compressive strain in accordance with DIN 53 421/DIN EN ISO 604 is from greater than 15 to less than 80 kPa. The open-cell factor for semirigid polyurethane foams and flexible polyurethane foams of the invention in accordance with DIN ISO 4590 is preferably greater than 85%, particularly preferably greater than 90%. Further details concerning flexible polyurethane foams and semirigid polyurethane foams of the invention are found in "Kunststoffhandbuch, Band 7, Polyurethane" [Plastics Handbook, volume 7, Polyurethanes], Carl Hanser Verlag, 3rd edition 1993, chapter 5.

The compressive stress value for the rigid polyurethane foams of the invention at 10% compressive strain is greater than or equal to 80 kPa, preferably greater than or equal to 150 kPa, particularly preferably greater than or equal to 180 kPa. The close-cell factor for the rigid polyurethane foam in accordance with DIN ISO 4590 is usually greater than 85%, preferably greater than 90%. Further details concerning rigid polyurethane foams of the invention are found in "Kunststoffhandbuch, Band 7, Polyurethane" [Plastics Handbook, volume 7, Polyurethanes], Carl Hanser Verlag, 3rd edition 1993, chapter 6.

It is particularly preferable that the flame-retardant polyurethane foam of the invention is a plastically deformable rigid polyurethane foam or semirigid polyurethane foam, which is preferably used for sound-deadening in the passenger compartment or in the engine compartment of vehicles. Plastically deformable rigid polyurethane foams or semirigid polyurethane foams of this type have a high open-cell factor which is preferably greater than 50%, particularly preferably greater than 80%, and in particular greater than 90%, in accordance with DIN ISO 4590. Plastically deformable rigid polyurethane foams or semirigid polyurethane foams, and use of same as internal cladding in motor vehicles, are known and are described by way of example in "Kunststoffhandbuch, Band 7, Polyurethane" [Plastics Handbook, volume 7, Polyurethanes], Carl Hanser Verlag, 3rd edition 1993, chapter 6.5.4.1, or in WO 2009203764.

Plastically deformable rigid polyurethane foams or semirigid polyurethane foams of the invention can preferably be plastically deformed at mold temperatures of from 80 to 180° C., particularly preferably from 100 to 150° C.

Organic polyisocyanates a) used are preferably the aromatic polyisocyanates which are readily obtainable in industry, particularly preferably mixtures of diphenylmethane diisocyanates (MDI) and of polyphenyl polymethylene polyisocyanates, these mixtures being known as crude MDI, advantageously having from 30 to 65% by weight content of monomeric MDI, particularly preferably from 35 to 60% by weight, and in particular from 35 to 55% by weight.

The polyisocyanates a) can be used in the form of polyisocyanate prepolymers. Said polyisocyanate prepolymers are obtainable by reacting polyisocyanates (constituent (a-1)) described above in excess, for example at temperatures of from 30 to 100° C., preferably at about 80° C., with polyols (constituent (a-2)), to give the prepolymer. It is preferable to use, for this purpose, the polyols described below under b). It is optionally also possible to add chain extenders (a-3) to the reaction to give the polyisocyanate prepolymer. Chain extenders (a-3) used can be any of the chain extenders described below under c). It is preferable here that the ratio of organic polyisocyanates (a-1) to polyols (a-2) and chain extenders (a-3) is selected in such a way that the NCO content of the isocyanate prepolymer is from 10 to 28%, particularly from 14 to 24%.

Other materials suitable as organic polyisocyanate a) are the modified crude MDI materials comprising isocyanurate groups, biuret groups, carbodiimide groups, and/or preferably urethane groups. For particular application sectors it can moreover be advantageous to add, to the crude MDI, subordinate amounts, for example up to at most 10% by weight, of tolylene diisocyanate isomer mixtures and/or optionally biuret-group-modified, carbodiimide-group-modified, and/or urethane-group-modified 4,4'- and/or 2,4'-MDI.

Polymeric compounds used having at least two hydrogen atoms reactive toward isocyanates (b) and having a molar mass of at least 500 g/mol can be any of the compounds used known for polyurethane production and having at least two reactive hydrogen atoms and having a molar mass of at least 500 g/mol. The functionality of these is by way of example from 2 to 8, with a molecular weight of from 400 to 12 000. By way of example, it is therefore possible to use polyether polyamines and/or polyols selected from the group of the polyether polyols and polyester polyols, or a mixture thereof.

The polyols preferably used are polyetherols and/or polyesterols with molecular weights of between 500 and 12 000, preferably from 500 to 6000, in particular from 500 to less than 3000, and preferably of average functionality from 2 to 6, preferably from 2 to 4.

The polyetherols that can be used in the invention are produced by known processes. By way of example, they can be produced via anionic polymerization using alkali metal hydroxides, e.g. sodium hydroxide or potassium hydroxide, or using alkali metal alcoholates, e.g. sodium methanolate, sodium ethanolate or potassium ethanolate, or potassium isopropanolate, as catalysts, and with addition of at least one starter molecule which has from 2 to 8, preferably from 2 to 6, reactive hydrogen atoms, or via cationic polymerization using Lewis acids, such as antimony pentachloride, boron fluoride etherate, etc., or bleaching earth, as catalysts. Polyether polyols can likewise be produced via double-metal-cyanide catalysis, from one or more alkylene oxides having from 2 to 4 carbon atoms in the alkylene moiety. It is also possible to use tertiary amines as catalyst, an example being triethylamine, tributylamine, trimethylamine, dimethylethanolamine, imidazole, or dimethylcyclohexylamine. It is also possible, for specific intended uses, to incorporate monofunctional starters into the structure of the polyether.

Examples of suitable alkylene oxides are tetrahydrofuran, propylene 1,3-oxide, butylene 1,2- or 2,3-oxide, styrene oxide, and preferably ethylene oxide and propylene 1,2-oxide. The alkylene oxides can be used individually, in alternating succession, or in the form of a mixture.

Examples of starter molecules that can be used are: water, aliphatic and aromatic, optionally N-mono-, or N,N- or N,N'-dialkyl-substituted diamines having from 1 to 4 carbon atoms in the alkyl moiety, for example optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5-, and 1,6-hexamethylenediamine, phenylenediamine, 2,3-, 2,4-, and 2,6-tolylenediamine (TDA), and 4,4'-, 2,4'-, and 2,2'-diaminodiphenylmethane (MDA), and polymeric MDA. Other starter molecules that can be used are: alkanolamines, e.g. ethanolamine, N-methyl-, and N-ethylethanolamine, dialkanolamines, e.g. diethanolamine, N-methyl-, and N-ethyldiethanolamine, trialkanolamines, e.g. triethanolamine, and ammonia. It is preferable to use polyhydric alcohols, such as ethanediol, 1,2- and 2,3-propanediol, diethylene glycol, dipropylene glycol, 1,4-butanediol, 1,6-hexanediol, glycerol, trimethylolpropane; pentaerythritol, sorbitol, and sucrose, and mixtures thereof. The polyether polyols can be used individually or in the form of a mixture.

Polyesterols are produced by way of example from alkanedicarboxylic acids and from polyhydric alcohols, polythioetherpolyols, polyesteramides, hydroxylated polyacetals, and/or hydroxylated aliphatic polycarbonates, preferably in the presence of an esterification catalyst. Other possible polyols are given by way of example in "Kunststoffhandbuch, Band 7, Polyurethane" [Plastics Handbook, volume 7, Polyurethanes], Carl Hanser Verlag, 3rd edition 1993, chapter 3.1.

The polyesterols used with preference can by way of example be produced from dicarboxylic acids having from 2 to 12 carbon atoms, preferably from 4 to 6 carbon atoms, and from polyhydric alcohols. Examples of dicarboxylic acids that can be used are: aliphatic dicarboxylic acids, such as succinic acid, glutaric acid, adipic acid, suberic acid, azelaic acid, and sebacic acid, and aromatic dicarboxylic acids, such as phthalic acid, isophthalic acid, and terephthalic acid. The dicarboxylic acids can be used individually or in the form of mixtures, e.g. in the form of a mixture of succinic, glutaric, and adipic acid. It can optionally be advantageous for producing the polyesterols to use, instead of the dicarboxylic acids, the corresponding dicarboxylic acid derivatives, such as dicarboxylic esters having from 1 to 4 carbon atoms in the alcohol moiety, dicarboxylic anhydrides, or diacyl chlorides. Examples of polyhydric alcohols are glycols having from 2 to 10, preferably from 2 to 6, carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol, and dipropylene glycol, triols having from 3 to 6 carbon atoms, e.g. glycerol and trimethylolpropane, and, as higher-functionality alcohol, pentaerythritol. The polyhydric alcohols can be used alone or optionally in mixtures with one another, in accordance with the properties desired.

Chain extenders and/or crosslinking agents c) that can be used are substances having a molar mass which is preferably smaller than 500 g/mol, particularly preferably from 60 to 400 g/mol, where chain extenders have 2 hydrogen atoms reactive toward isocyanates and crosslinking agents have 3 hydrogen atoms reactive toward isocyanate. These can be used individually or preferably in the form of a mixture. It is preferable to use diols and/or triols having molecular weights smaller than 500, particularly from 60 to 400, and in particular from 60 to 350. Examples of those that can be used are aliphatic, cycloaliphatic, and/or araliphatic diols having from 2 to 14, preferably from 2 to 10, carbon atoms, e.g. ethylene glycol, 1,3-propanediol, 1,4-butanediol, 1,6-hexanediol, 1,10-decanediol, and bis(2-hydroxyethyl)hydroquinone, 1,2-, 1,3-, and 1,4-dihydroxycyclohexane, diethylene glycol, dipropylene glycol, tripropylene glycol, triols, such as 1,2,4- or 1,3,5-trihydroxycyclohexane, glycerol, and trimethylolpropane, and low-molecular-weight hydroxylated polyalkylene oxides based on ethylene oxide and/or on propylene 1,2-oxide, and on the abovementioned diols and/or triols, as starter molecules. It is particularly preferable to use, as crosslinking agents (c), low-molecular-weight hydroxylated polyalkylene oxides based on ethylene oxide and/or on propylene 1,2-oxide, particularly preferably on ethylene and on trifunctional starters, in particular glycerol.

The proportion of chain extender and/or crosslinking agent c), based on the total weight of components b) to f), if these are present, is preferably from 1 to 60% by weight, particularly preferably from 3 to 40% by weight, and in particular from 4 to 15% by weight.

If the flame-retardant polyurethane foams of the invention are plastically deformable rigid polyurethane foams or semirigid polyurethane foams, it is preferable to use polyetherols as polymeric compounds (b) having at least two hydrogen atoms reactive toward isocyanates. It is particularly preferable that these comprise at least one di- to trifunctional polyoxyalkylene polyol (b1) having a hydroxy number of from 20 to 40 and having a proportion greater than 70% of primary hydroxy groups. The polyoxyalkylene polyol (b1) preferably comprises at least 50% by weight of propylene oxide, particularly preferably at least 80% by weight.

In particular for producing plastically deformable semirigid polyurethane foams, it is possible to use, alongside the polyoxyalkylene polyol (b1), a polyoxyalkylene polyol (b2) which has a functionality of from 2 to 4, a hydroxy number of from 25 to 60, a proportion greater than 70% of primary OH groups, preferably greater than 80%, based in each case on the total number of OH groups, and an ethylene oxide content which is preferably at least 50% by weight, particularly preferably from 60% by weight to 95% by weight.

Another material used to produce a plastically deformable rigid polyurethane foam or semirigid polyurethane foam is at least one di- to tetrahydric polyoxyalkylene polyol (c1) having a hydroxy number of from 150 to 650 and a proportion greater than 80% of primary hydroxy groups, where the polyhydroxy compound (c1) preferably comprises at least 30% by weight of ethylene oxide, particularly preferably at least 50% by weight. It is preferable that, alongside component c1 another component (c2) is also used, having a functionality of 3 and a molar mass which is preferably smaller than 200 g/mol and particularly preferably smaller than 150 g/mol.

The proportion of components (b1), (b2), (c1), and (c2) here, based on the total weight of components (b) and (c), is preferably greater than 60% by weight, particularly preferably greater than 80% by weight, and in particular greater than 90% by weight. The proportion by weight of components (b1), (b2), (c1), and (c2) here, based on the total weight of said components, is from 25 to 50% by weight of (b1), from 15 to 30% by weight of (b2), from 25 to 50% by weight of (c1), and from 0 to 10% by weight of (c2).

Flame retardants (d) used are flame retardants which comprise expandable graphite and which comprise oligomeric organophosphorus flame retardant.

Expandable graphite is well known. This comprises one or more expandable materials, so that considerable expansion takes place under the conditions present in a fire. Expandable graphite is produced by known processes. The usual method here begins by modifying graphite with oxidants, such as nitrates, chromates, or peroxides, or via electrolysis, in order to open the crystal layers, and nitrates or sulfates are then intercalated into the graphite, and can bring about expansion under given conditions.

The amount of the expandable graphite used in the flame-retardant polyurethane foams of the invention is usually smaller than 20% by weight, based on the total weight of components (a) to (g). It is preferable to use from 1 to 15% by weight of expandable graphite, based on the weight of components (a) to (g), particularly from 2 to 10% by weight, and in particular from 4 to 9% by weight.

The oligomeric organophosphorus flame retardant preferably comprises no less than 5% by weight of phosphorus content, with the presence of at least 3 phosphate ester units in preferred embodiments. "Phosphorus ester units" here comprise phosphate ester units and phosphonate ester units. The oligomeric organophosphorus flame retardants of the invention therefore comprise structures having pure phosphonate units, having pure phosphate units, and also having phosphonate units and phosphate units.

The term "oligomer" used herein means that organophosphorus flame retardants which comprise only one or only two phosphorus ester units are excluded. An organophosphorus flame retardant of this type is described in very general terms in U.S. Pat. No. 4,382,042. Preference is given here to organophosphorus flame retardants which comprise no halogen atoms. Said preferred organophosphate oligomers can be produced via reaction of phosphorus pentoxide with the selected trialkyl phosphate, for example with triethyl phosphate, thus forming a polyphosphate ester which comprises P—O—P bonds, which are then reacted with epoxide, e.g. with ethylene oxide, to form the desired product. Said preferred oligomeric organophosphorus flame retardant has the formula (I):

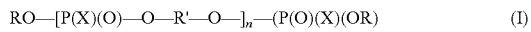  (I)

wherein n is a natural number from 2 to 25, preferably from 2 to 20, X is mutually independently —R or —OR, preferably exclusively —OR, and R is mutually independently an organic moiety selected from the group consisting of alkyl having from 1 to 10 carbon atoms and hydroxyalkyl having from 1 to 10 carbon atoms, and R' is an alkylene group having from 1 to 10 carbon atoms. It is preferable here to use oligomeric organophosphorus flame retardants which have different values for n, and it is particularly preferable here that the numeric average of n is from 2 to 20.

Particularly preferred oligomeric phosphates comprise ethyl and ethylene groups as the alkyl and alkylene moieties, have hydroxy functionality of not more than 30 mg KOH/g, an acid number of not more than about 2.5 mg KOH/g, and phosphorus content from about 15 to about 25% by weight. These are termed "PEEOP" (or "poly(ethylethyleneoxy) phosphate") hereinafter. A commercially available example of an oligomeric organophosphorus flame retardant is FYROL® 51 from Akzo Nobel Chemicals Inc., which is produced by a multistage process from dimethyl methylphosphonate, phosphorus pentoxide, ethylene glycol, and ethylene oxide. Another preferred oligomeric organophosphorus flame retardant available commercially is FYROL® PNX. This is an oligomeric phosphate ester of the formula RO—[P(OR)(O)—O—R'—O—]$_n$—(P(O)(OR)$_2$, in which the numeric average of n is in the range of about 2 to 20, R is ethyl and R' is ethylene. It preferably has about 19% by weight phosphorus content, its viscosity being about 2000 mPas at 25° C.

The content of the oligomeric organophosphorus flame retardant, based on the total weight of components (a) to (g), is preferably from 0.1 to 10% by weight, particularly preferably from 0.5 to 8% by weight, and in particular from 1 to 5% by weight.

It is possible to use one or more arbitrary flame retardant(s) usually used, alongside the oligomeric organophosphorus flame retardants and expandable graphite, for polyurethanes. These comprise halogen-substituted phosphates, such as tricresyl phosphate, tris(2-chloroethyl)phosphate, tris(2-chloropropyl)phosphate, tris(1,3-dichloropropyl) phosphate, tris(2,3-dibromopropyl)phosphate, and tetrakis (2-chloroethyl)ethylene diphosphate, and/or inorganic flame retardants, such as red phosphorus, aluminum oxide hydrate, antimony trioxide, arsenic oxide, ammonium polyphosphate, and calcium sulfate, and/or cyanuric acid derivatives, e.g. melamine.

It is preferable that the flame retardants (d) comprise no compounds having halogen groups. It is particularly preferable that the flame retardants (d) comprise, alongside the oligomeric organophosphorus flame retardant and expandable graphite, less than 30% by weight of further flame retardants, particularly preferably less than 10% by weight, based in each case on the total weight of the flame retardants (d). In particular, the flame retardants (d) comprise no further flame retardants alongside the oligomeric organophosphorus flame retardant and expandable graphite.

The blowing agent (e) used preferably comprises blowing agent comprising water. The blowing agent (e) used can also comprise, as well as water, well-known compounds having chemical and/or physical effect. Chemical blowing agents are compounds which form gaseous products through reaction with isocyanate, an example being water or formic acid. Physical blowing agents are compounds which have been dissolved or emulsified in the starting materials for polyurethane production and which vaporize under the conditions of polyurethane formation. By way of example, these are hydrocarbons, halogenated hydrocarbons, and other compounds, such as perfluorinated alkanes, e.g. perfluorohexane, fluorochlorocarbons, and ethers, esters, ketones and/or acetals, examples being (cyclo)aliphatic hydrocarbons having from 4 to 8 carbon atoms, or fluorocarbons such as Solkane® 365 mfc from Solvay Fluorides LLC. In one preferred embodiment, water as sole blowing agent is used as blowing agent (e).

In one preferred embodiment, the content of water is from 1 to 10% by weight, preferably from 2 to 9% by weight, particularly preferably from 3 to 7% by weight, based on the total weight of components (b) to (f).

Among the catalysts (f) are compounds which accelerate the reaction between the organic polyisocyanates a) and the polyhydroxy compounds b) comprising reactive hydrogen atoms, in particular hydroxy groups, and also with the chemical blowing agent. Organometallic compounds can be used, preferably organotin compounds, such as tin(II) salts of organic carboxylic acids, e.g. tin(II) acetate, tin(II) octoate, tin(II) ethylhexanoate, tin(II) laurate, and the dialkyltin(IV) salts of organic carboxylic acids, for example dibutyltin diacetate, dibutyltin dilaurate, dibutyltin maleate, dioctyltin diacetate, and also tertiary amines, such as triethylamine, tributylamine, dimethylcyclohexylamine, dimethylbenzylamine, N-methylimidazole, N-methyl-, N-ethyl-, and N-cyclohexylmorpholine, N,N,N',N'-tetramethylethylenediamine, N,N,N',N'-tetramethylbutylenediamine, N,N, N',N'-tetramethyl-1,6-hexylenediamine, pentamethyldiethylenetriamine, tetramethyl diaminoethyl ether, bis (dimethylaminopropyl)urea, dimethylpiperazine, 1,2-dimethylimidazole, 1-azabicyclo[3.3.0]octane, 1,4-diazabicyclo[2.2.2]octane, and alkanolamine compounds, such as triethanolamine, triisopropanolamine, N-methyl- and N-ethyldiethanolamine, and dimethylethanolamine. Other catalysts that can be used are: tris(dialkylamino)-s-hexahydrotriazines, in particular tris(N,N-dimethylamino)-s-hexahydrotriazine, tetraalkylammonium salts, such as N,N,N-trimethyl-N-(2-hydroxypropyl) formate, N,N,N-trimethyl-N-(2-hydroxypropyl) 2-ethylhexanoate, tetraalkylammonium hydroxides, such as tetramethylammonium hydroxide, alkali metal hydroxides, such as sodium hydroxide, alkali metal alkoxides, such as sodium methoxide and potassium isopropoxide, and also the alkali metal or alkaline earth metal salts of fatty acids having from 1 to 20 carbon atoms and, optionally, having pendent OH groups.

Examples of catalyst e) that can be used are tertiary amines reactive toward isocyanates, e.g. N,N-dimethylaminopropylamine, bis(dimethylaminopropyl)amine, N,N-dimethylaminopropyl-N'-methylethanolamine, dimethylaminoethoxyethanol, bis(dimethylaminopropyl)amino-2-propanol, N,N-dimethylaminopropyldipropanolamine, N,N, N'-trimethyl-N'-hydroxyethylbisaminoethyl ether, N,N-dimethylaminopropylurea, N-(2-hydroxypropyl)imidazole, N-(2-hydroxyethyl)imidazole, N-(2-aminopropyl)imidazole, and/or the reaction products described in EP-A 0 629 607 composed of ethyl acetoacetate, and of polyether polyols, and 1-(dimethylamino)-3-aminopropane.

Auxiliaries and additives (g) that can be used comprise foam stabilizers, cell openers, surfactants, reaction retardants, stabilizers with respect to aging effects and weathering effects, plasticizers, fungistatic and bacteriostatic substances, pigments and dyes, and also the conventional organic and inorganic fillers known per se.

The foam stabilizers used preferably comprise silicone-based foam stabilizers. The foam stabilizers used can also comprise siloxane-polyoxyalkylene copolymers, organopolysiloxanes, ethoxylated fatty alcohols, and alkylphenols, and castor oil esters and, respectively, ricinoleic esters.

Examples of cell openers are paraffins, polybutadienes, fatty alcohols, and dimethylpolysiloxanes.

The stabilizers used with respect to aging and weathering effects mostly comprise antioxidants. By way of example, these can be sterically hindered phenols, HALS stabilizers (hindered amine light stabilizer), triazines, benzophenones, and benzotriazoles.

Examples of surfactants that can be used are compounds which serve to promote homogenization of the starting materials and ensure phase stability of the polyol component over prolonged periods. These are, optionally, also suitable for regulating cell structure. Mention may be made by way of example of emulsifiers, such as the sodium salts of castor oil sulfates, or of fatty acids, and also salts of fatty acids with amines, e.g. diethylamine oleate, diethanolamine stearate, diethanolamine ricinoleate, salts of sulfonic acids, e.g. the alkali metal or ammonium salts of dodecylbenzene- or dinaphthylmethanedisulfonic acid and ricinoleic acid; foam stabilizers, such as siloxane-oxalkylene copolymers and other organopolysiloxanes, ethoxylated alkylphenols, ethoxylated fatty alcohols, paraffin oils, castor oil esters and, respectively, ricinoleic esters, Turkey red oil, and peanut oil, and cell regulators, such as paraffins, fatty alcohols, and dimethylpolysiloxanes. Other suitable compounds for improving emulsifying effects, or cell structure, and/or for stabilizing the foam are oligomeric polyacrylates having polyoxyalkylene and fluoroalkane radicals as pendent groups.

The amounts usually used of the surfactants, based on the total weight of the polyhydroxy compounds b), are usually from 0.01 to 5% by weight.

Fillers that can be added, in particular reinforcing fillers, comprise the materials known per se which are conventional organic and inorganic fillers, reinforcing agents, and weighting agents. In detail, examples that may be mentioned are: inorganic fillers, e.g. silicatic minerals, for example phyllosilicates, such as antigorite, serpentine, hornblendes, amphiboles, chrysotile, zeolites, talc; metal oxides, e.g. kaolin, aluminum oxides, aluminum silicate, titanium oxides, and iron oxides, metal salts, e.g. chalk, barite, and inorganic pigments, such as cadmium sulfide, zinc sulfide, and also glass particles. Examples of organic fillers that can be used are: carbon black, melamine, collophony, cyclopentadienyl resins, and polymer-modified polyoxyalkene polyols.

Further information concerning the mode of use and of action of the above-mentioned auxiliaries and additives, and also further examples, are given by way of example in "Kunststoffhandbuch, Band 7, Polyurethane" ["Plastics handbook, volume 7, Polyurethanes"], Carl Hanser Verlag, 3rd edition 1993, chapter 3.4.

The amounts reacted of organic polyisocyanates (a), polymeric compounds (b) having at least two hydrogen atoms reactive toward isocyanates, chain extenders and/or cross-linking agents (c), flame retardants (d), blowing agents (e), catalysts (f), and optionally auxiliaries and additives (g) are preferably such that the isocyanate index is in the range from 60 to 400, particularly preferably from 80 to 150. The isocyanate index during production of the plastically deformable polyurethane foams is preferably from 95 to 130, particularly preferably from 98-118.

For the purposes of the present invention, this isocyanate index is the stoichiometric ratio of isocyanate groups to groups reactive toward isocyanate, multiplied by 100. Groups reactive toward isocyanate here are any of the groups which are present in the reaction mixture and which are reactive toward isocyanate, inclusive of chemical blowing agents, but not the isocyanate group itself.

The flame-retardant polyurethane foams of the invention are preferably produced by the one-shot process in the form of large foam slabs, continuously in slab-foam systems, or batchwise in open foam molds. If a mixing chamber with a plurality of inlet nozzles is used, the starting components can be introduced individually and mixed intensively in the mixing chamber. It has proven particularly advantageous to use the 2-component process and to use, as what is known as component A, a mixture from the mixing of the polymeric compounds (b) having at least two hydrogen atoms reactive toward isocyanates, chain extenders and/or crosslinking agents (c), flame retardants (d), blowing agents (e), catalysts (f), and optionally auxiliaries and additives (g), and to use, as what is known as component B, the organic, optionally modified polyisocyanates (a). Since the A and B components have very good shelf life, they can easily be transported in this form, and all that is required prior to processing is then that the appropriate amounts be intensively mixed. High-pressure or low-pressure processing systems can be used to mix structural components (a) to (g), or components (A) and (B).

The flame-retardant polyurethane foams are produced by mixing the starting materials described, advantageously in the form of components A and B, at temperatures of about 15 to 60° C., preferably 20 to 40° C., and then permitting the reaction mixture to foam in open, optionally temperature-controlled molds, or in continuously operating slab-foam systems.

The densities of the resultant polyurethane foams depend on the amount of blowing agent used and are from 5 to 50 g/L, preferably from 5 to 30 g/L, and particularly preferably from 5 to 20 g/L. At the same time, the products exhibit very good hydrolysis resistance.

From the resultant polyurethane foam slabs it is possible, if necessary, to cut foam slabs dimensioned in accordance with the molding to be produced, and to split these to give rigid PU foam sheets of thickness from 4 to 50 mm, preferably from 6 to 30 mm, and in particular from 6 to 20 mm. Any of the conventional industrial splitting devices is suitable for this purpose, but in practice it is preferable to use horizontal splitting systems with circulating band knife.

Polyurethane foams of the invention exhibit advantageous fire performance and are stable in processing, i.e. by way of example less shrinkage occurs than with conventional flame retardant combinations. Open-cell semirigid polyurethane foams or rigid polyurethane foams with a low density which is preferably smaller than 50 g/L, particularly preferably from 5 to 30 g/L, and in particular from 5 to 20 g/L, are particularly susceptible to shrinkage during production. Surprisingly, it has been found here that when the flame retardants of the invention are used said foams shrink less, or not at all. Furthermore, the plastically deformable polyurethane foams of the invention in essence emit no hydrogen halides during thermoplastic processing.

The polyurethane foams of the invention have excellent suitability for use in vehicles, in particular in the interior of automobiles, as cladding of bulkheads, doors, and roofs, or in the engine compartment. The plastically deformable polyurethane foams preferred in the invention exhibit excellent acoustic absorption here.

Examples will be used below to illustrate the invention.

Starting Materials:

Polyol A: polyetherol having an OH number of 28 mgKOH/g and a functionality of 2.7, based on ethylene oxide and propylene oxide, having 84% propylene oxide content and 14% ethylene oxide content Polyol B: polyetherol with an OH number 535 mgKOH/g and a functionality of 3, based on ethylene oxide Polyol C: polyetherol with an OH number 42 mgKOH/g, a functionality of 2.7, based on ethylene oxide DC 198: DABCO DC198 cell stabilizer from Air Products Kosmos 29: catalyst from Evonik Flame Retardants Expandable graphite: expandable graphite from LUH TEP: triethyl phosphate from ICL Industrial Products Reofos® 50: isopropylated triaryl phosphate from Chemtura Fyrol® PNX: oligomeric phosphate ester from ICL Industrial Products Isocyanate: 60 parts of Lupranat M 20 W (polymer MDI with NCO content 31.2) and 40 parts of Lupranat MI (mixture of 2,4'- and 4,4'-MDI with NCO content 33.2)

The mixture A was prepared by blending the following components:

37.4 pts. of polyol A 35 pts. of polyol B 23 pts. of polyol C 4.6 pts. of glycerol The following formulations were produced in a 125 l box, with adjustment of the isocyanate index to 104:

|  | CE1 | CE2 | CE3 | CE4 | IE1 | IE2 |
|---|---|---|---|---|---|---|
| Mixture A | 70.7 | 85.7 | 80.7 | 60.7 | 65.7 | 60.7 |
| Water | 8 | 8 | 8 | 8 | 8 | 8 |
| DC 198 | 0.8 | 0.8 | 0.8 | 0.8 | 0.8 | 0.8 |
| Kosmos 29 | 0.5 | 0.5 | 0.5 | 0.5 | 0.5 | 0.5 |
| Flame retardant | | | | | | |
| Expandable graphite | 20 | — | — | 20 | 20 | 20 |
| Reofos 50 | — | — | — | 10 | — | — |
| Fyrol PNX | — | 5 | 10 | — | 5 | 10 |
| Total | 100 | 100 | 100 | 100 | 100 | 100 |
| Isocyanates | | | | | | |
| Isocyanate | 157 | 165 | 163 | 152 | 155 | 152 |
| % by wt. of p | — | 0.3 | 0.7 | 0.3 | 0.3 | 0.7 |
| Properties | | | | | | |
| Cream time (s) | 40 | 40 | 40 | 33 | 38 | 38 |
| Fiber time (s) | 74 | 100 | 99 | 68 | 80 | 84 |
| Density[1] (g/L) | 15.3 | 15.6 | 15.0 | 15.8 | 16.2 | 15.7 |
| Compressive strength[2] (kPa) 40% | 29.2 | — | — | 32.0 | 33.2 | 33.1 |

[1]DIN EN ISO 845
[2]DIN EN ISO 3386

Experiments in using triethyl phosphate as flame retardant led to severe shrinkage.

Fire Tests

| ISO 3795 | | | | | | |
|---|---|---|---|---|---|---|
|  | CE1 | CE2 | CE3 | CE4 | IE1 | IE2 |
| Burnt length in advance of start line (mm) | 28 | 254 | 35 | 15 | 11 | 12 |
|  | 27 | 254 | 30 | 17 | 13 | 10 |
|  | 29 | 254 | 56 | 19 | 15 | 10 |
|  | 33 | 254 | 36 | 14 | 12 | 11 |
|  | 38 | 254 | 27 | 24 | 16 | 8 |
| Average (mm) | 31 | 254 | 37 | 18 | 13 | 10 |

| California Test 117 | | | | | | |
|---|---|---|---|---|---|---|
|  | CE1 | CE2 | CE3 | CE4 | IE1 | IE2 |
| length destroyed (mm) | 4 | — | — | 4 | 3 | 2 |
| Afterflame time (s) | 5 | — | — | 4 | 0 | 0 |
|  | 10 | — | — | 0 | 0 | 0 |
|  | >10 | — | — | 3 | 0 | 0 |
|  | >10 | — | — | 7 | 0 | 0 |
|  | >10 | — | — | 5 | 0 | 0 |
| Average (s) | >10 | — | — | 4 | 0 | 0 |

Test specimens of examples CE1, CE4, IE1, and IE2 were also subjected to the Volkswagen test PV3357. For this, the test sheets were on one occasion placed horizontally, so that flame application takes place on the surface, and on another occasion vertically, so that flame application takes place on the edge. In the case of flame application on the surface, the flame applied is a vigorous yellow flame of height 100 mm from a Bunsen burner, and the distance between the specimen sheet and the Bunsen burner gas outlet here is 90 mm. In the case of flame application on the edge, the flame applied is a vigorous yellow flame of height 40 mm from a Bunsen burner, and the distance between the specimen sheet and the Bunsen burner gas outlet here is 30 mm. The combustion time stated here is the time elapsed between ignition of the specimen and extinguishment thereof.

|  | CE1 | CE4 | 1E1 | 1E2 |
|---|---|---|---|---|
| Flame application on the edge - brief (15 seconds) | | | | |
| Combustion time (s) | 14 | 15 | 10 | 10 |
| Height of damaged region (mm) | 160 | 110 | 100 | 70 |
| Flame application on the edge - long (10 minutes) | | | | |
| Combustion time (s) | 39 | 28 | 26 | 16 |
| Height of damaged region (mm) | 170 | 130 | 100 | 100 |
| Flame application on the surface - brief (15 seconds) | | | | |
| Combustion time (s) | 14 | 14 | 10 | 10 |
| ∅ of damaged region (mm) | 120 | 110 | 65 | 60 |
| Flame application on the surface - long (10 minutes) | | | | |
| Combustion time (s) | 15 | 19 | 7 | 8 |
| ∅ of damaged region (mm) | 130 | 90 | 80 | 90 |
| Average (mm) | 145 | 110 | 86 | 80 |

∅ diameter

The invention claimed is:

1. A process for producing a deformable rigid or semirigid flame-retardant polyurethane foam having a density of from 5 to 20 g/L, the process comprising:
   mixing
   a) an organic polyisocyanate comprising at least one diphenylmethane diisocyanate with
   b) at least one polymeric compound comprising a polyetherol, c) optionally a chain extender and/or a crosslinking agent,
d) a flame retardant,
e) a blowing agent,
f) at least one catalyst, and optionally
g) at least one additive, thereby producing a reaction mixture and
permitting said reaction mixture to react completely,
where the flame retardant (d) comprises an expandable graphite present in an amount of 20 wt. % or less, based on the total weight of components (a) to (g), and an oligomeric organophosphorus flame retardant present in an amount of 0.1 to 10 wt. %, based on the total weight of components (a) to (g), wherein the oligomeric organophosphorus flame retardant comprises at least 3 phosphorus ester units and at least 5% by weight of phosphorus, based on the total weight of the oligomeric organophosphorus flame retardant.

2. The process according to claim 1, wherein the oligomeric organophosphorus flame retardant has formula (I)

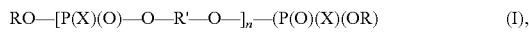
$$RO-[P(X)(O)-O-R'-O-]_n-(P(O)(X)(OR)) \quad (I),$$

wherein n is a natural number from 2 to 25,
—X is mutually independently —OR or —R,
—R is mutually independently an organic moiety selected from the group consisting of alkyl having from 1 to 10 carbon atoms and hydroxyalkyl having from 1 to 10 carbon atoms, and
R' is an alkylene group having from 1 to 10 carbon atoms.

3. The process according to claim 2, wherein X is —OR.

4. The process according to claim 2, wherein —R is an ethyl moiety and —R' is an ethylene moiety.

5. The process according to claim 2, wherein the oligomeric organophosphorus flame retardant is a mixture of two or more compounds of the formula (I) which differ by different values for n.

6. The process according to claim 1, wherein the amount of the expandable graphite is from 1 to 15% by weight, based on the total weight of components (a) to (g), and the amount of the oligomeric organophosphorus flame retardant is from 0.5 to 8% by weight, based on the total weight of components (a) to (g).

7. The process according to claim 1, wherein the organic polyisocyanate (a) comprises a mixture of at least one diphenylmethane diisocyanate and of at least one polyphenyl polymethylene polyisocyanate.

8. The process according to claim 1, wherein the blowing agent (e) is water.

9. The process according to claim 1 wherein a content of expandable graphite is 2 to 10% by weight based on a total weight of components (a)-(g).

10. The process according to claim 1 wherein a content of expandable graphite is 4-20% by weight based on a total weight of components (a)-(g).

11. The process according to claim 1 wherein a content of oligomeric organophosphorus flame retardant is 0.5 to 8 wt. % based on a total weight of components (a)-(g).

12. The process according to claim 1 wherein a content of oligomeric organophosphorus flame retardant is 0.5 to 10 wt. % based on a total weight of components (a)-(g).

13. The process according to claim 1 wherein a content of oligomeric organophosphorus flame retardant is 5 to 10 wt. % based on a total weight of components (a)-(g).

14. The process according to claim 1 wherein, said oligomeric organophosphorus flame retardant has a formula $RO-[P(OR)(O)-O-R'-O-]_n-(P(O)(OR)_2$, in which the numeric average of n is in the range of about 2 to 20, R is ethyl and R' is ethylene.

15. The process according to claim 1, wherein said polyetherol comprises:
37.4 pbw of a polyetherol having an OH number of 28 mgKOH/g and a functionality of 2.7, based on ethylene oxide and propylene oxide, having 84% propylene oxide content and 14% ethylene oxide content;
35 pbw of a polyetherol with an OH number 535 mgKOH/g and a functionality of 3, based on ethylene oxide; and
23 pbw of a polyetherol with an OH number 42 mgKOH/g, a functionality of 2.7 based on ethylene oxide each based on 100 pbw of said polyetherol.

16. A process for producing a deformable rigid or semi-rigid flame-retardant polyurethane foam having a density of from 5 to 20 g/L, the process comprising:
mixing
a) an organic polyisocyanate comprising at least one diphenylmethane diisocyanate with
b) at least one polymeric compound comprising a polyetherol,
c) optionally a chain extender and/or a crosslinking agent,
d) a flame retardant,
e) a blowing agent,
f) at least one catalyst, and optionally
g) at least one additive, thereby producing a reaction mixture and
permitting said reaction mixture to react completely,
where the flame retardant (d) consists essentially of an expandable graphite present in an amount of from 1 to 15 wt. %, based on the total weight of components (a) to (g), and an oligomeric organophosphorus flame retardant present in an amount of 0.1 to 10 wt. %, based on the total weight of components (a) to (g), wherein the oligomeric organophosphorus flame retardant comprises at least 3 phosphorus ester units and at least 5% by weight of phosphorus, based on the total weight of the oligomeric organophosphorus flame retardant.

17. The process according to claim 1, wherein the amount of the expandable graphite is from 2 to 10% by weight, based on the total weight of components (a) to (g), and the amount of the oligomeric organophosphorus flame retardant is from 0.5 to 8% by weight, based in each case on the total weight of components (a) to (g).

18. The process according to claim 16, wherein the amount of the expandable graphite is from 2 to 10% by weight, based on the total weight of components (a) to (g), and the amount of the oligomeric organophosphorus flame retardant is from 0.5 to 8% by weight, based in each case on the total weight of components (a) to (g).

19. The process according to claim 1, wherein said polyetherol comprises:
a polyetherol having an OH number of 28 mgKOH/g and a functionality of 2.7, based on ethylene oxide and propylene oxide, having 84% propylene oxide content and 14% ethylene oxide content;
a polyetherol with an OH number 535 mgKOH/g and a functionality of 3, based on ethylene oxide; and
a polyetherol with an OH number 42 mgKOH/g, a functionality of 2.7 based on ethylene oxide.

20. The process according to claim 16, wherein said polyetherol comprises:

a polyetherol having an OH number of 28 mgKOH/g and a functionality of 2.7, based on ethylene oxide and propylene oxide, having 84% propylene oxide content and 14% ethylene oxide content;

a polyetherol with an OH number 535 mgKOH/g and a functionality of 3, based on ethylene oxide; and a polyetherol with an OH number 42 mgKOH/g, a functionality of 2.7 based on ethylene oxide.

* * * * *

UNITED STATES PATENT AND TRADEMARK OFFICE
CERTIFICATE OF CORRECTION

PATENT NO. : 10,640,602 B2
APPLICATION NO. : 13/731275
DATED : May 5, 2020
INVENTOR(S) : Iran Otero Martinez et al.

It is certified that error appears in the above-identified patent and that said Letters Patent is hereby corrected as shown below:

In the Specification

Column 5, Line 6, "can by" should read --can be--

Column 7, Line 11, "(P(O)" should read --P(O)--

Column 7, Line 36, "(P(O)" should read --P(O)--

Column 9, Line 30, "oxalkylene" should read --oxyalkylene--

Column 9, Line 47, "silicatic" should read --silicate--

Column 9, Line 54, "collophony," should read --colophony,--

Column 9, Line 57, "above-mentioned" should read --abovementioned--

Column 11, Line 12, "number" should read --number of--

Column 11, Line 14, "number" should read --number of--

In the Claims

Column 13, Line 23, Claim 2, "(P(O)" should read --P(O)--

Column 14, Line 3, Claim 14, "(P(O)" should read --P(O)--

Column 14, Line 13, Claim 15, "number" should read --number of--

Column 14, Line 16, Claim 15, "number" should read --number of--

Signed and Sealed this
Twenty-second Day of September, 2020

Andrei Iancu
*Director of the United States Patent and Trademark Office*

CERTIFICATE OF CORRECTION (continued)
U.S. Pat. No. 10,640,602 B2

Column 14, Line 62, Claim 19, "number" should read --number of--

Column 14, Line 64, Claim 19, "number" should read --number of--

Column 15, Line 5, Claim 20, "number" should read --number of--

Column 15, Line 7, Claim 20, "number" should read --number of--